(12) United States Patent
Starr

(10) Patent No.: US 7,851,069 B2
(45) Date of Patent: Dec. 14, 2010

(54) HEAT SHIELD WITH INTEGRAL ATTACHMENT FLANGES

(75) Inventor: George Starr, Fowlerville, MI (US)

(73) Assignee: Federal Mogul World-Wide, Inc., Southfield, MI (US)

( * ) Notice: Subject to any disclaimer, the term of this patent is extended or adjusted under 35 U.S.C. 154(b) by 921 days.

(21) Appl. No.: 11/560,914

(22) Filed: Nov. 17, 2006

(65) Prior Publication Data
US 2007/0116978 A1 May 24, 2007

Related U.S. Application Data

(60) Provisional application No. 60/737,973, filed on Nov. 18, 2005.

(51) Int. Cl.
*B32B 3/06* (2006.01)
*B32B 3/24* (2006.01)
*B32B 3/30* (2006.01)
*B21D 19/00* (2006.01)
*B21D 28/00* (2006.01)

(52) U.S. Cl. ............... 428/597; 428/132; 428/192; 29/896.6

(58) Field of Classification Search .............. None
See application file for complete search history.

(56) References Cited

U.S. PATENT DOCUMENTS

| | | | | |
|---|---|---|---|---|
| 1,296,272 A | * | 3/1919 | Doble | 428/594 |
| 3,008,551 A | * | 11/1961 | Cole Nelson E | 428/132 |
| 4,016,700 A | * | 4/1977 | Blomstedt | 52/481.1 |
| 4,430,764 A | * | 2/1984 | Finkelstein | 5/682 |
| 5,080,949 A | | 1/1992 | Nawrocki et al. | |
| 5,167,060 A | | 12/1992 | Nawrocki et al. | |
| 5,312,694 A | * | 5/1994 | Sugawara | 428/592 |
| 5,385,790 A | | 1/1995 | Atkinson et al. | |
| 5,656,353 A | | 8/1997 | Butler | |
| 6,206,730 B1 | * | 3/2001 | Avery et al. | 439/607.18 |
| 6,451,447 B1 | | 9/2002 | Ragland et al. | |
| 6,555,246 B1 | | 4/2003 | Zwick | |

* cited by examiner

*Primary Examiner*—John J Zimmerman
(74) *Attorney, Agent, or Firm*—Robert L. Stearns; Dickinson Wright PLLC

(57) ABSTRACT

An aluminum layered heat shield assembly (30) includes a pair of spaced metallic facing sheets (32) fabricated from an aluminum composition. In the interstitial space between the facing sheets (32), a perforated steel core (34) is formed in the general shape of a zigzag baffle with segments that adjoin and maintain a generally consistent spacing. The perforated steel core (34) is fabricated with non-perforated flanges (42) which project outwardly from between the aluminum facing sheets (32) to establish extensions for attachment to a supporting structure.

10 Claims, 2 Drawing Sheets

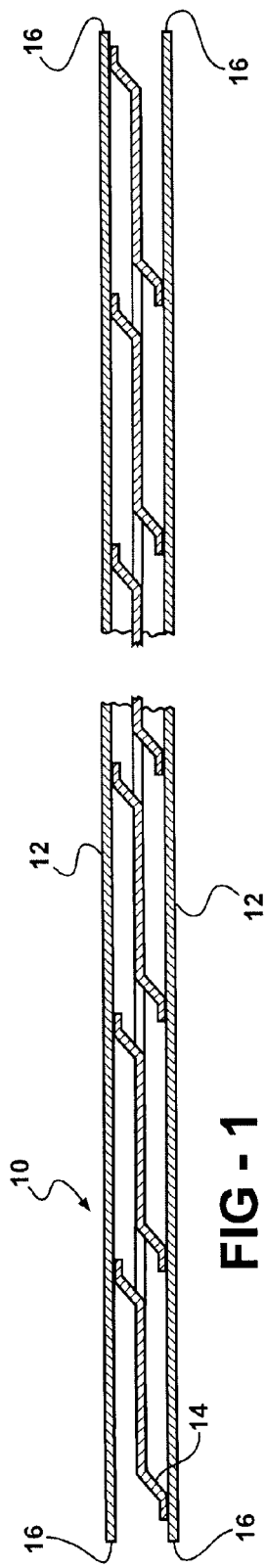
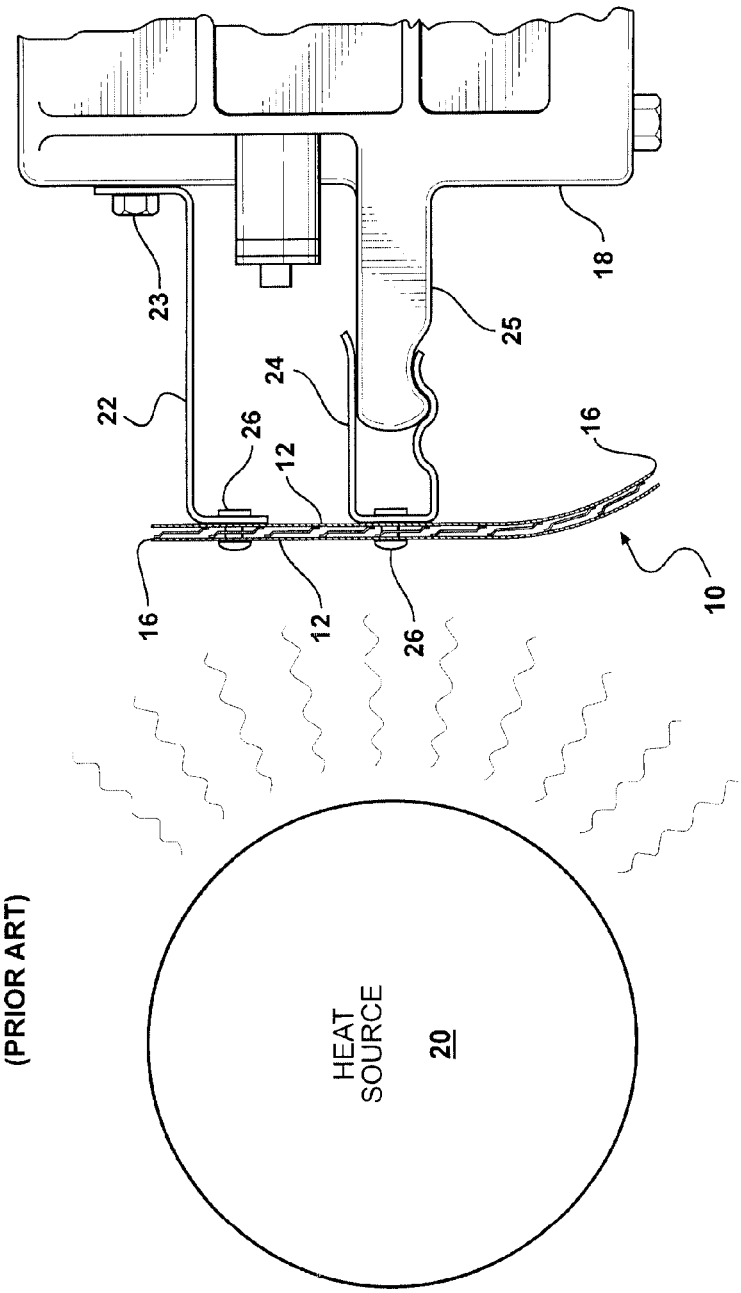

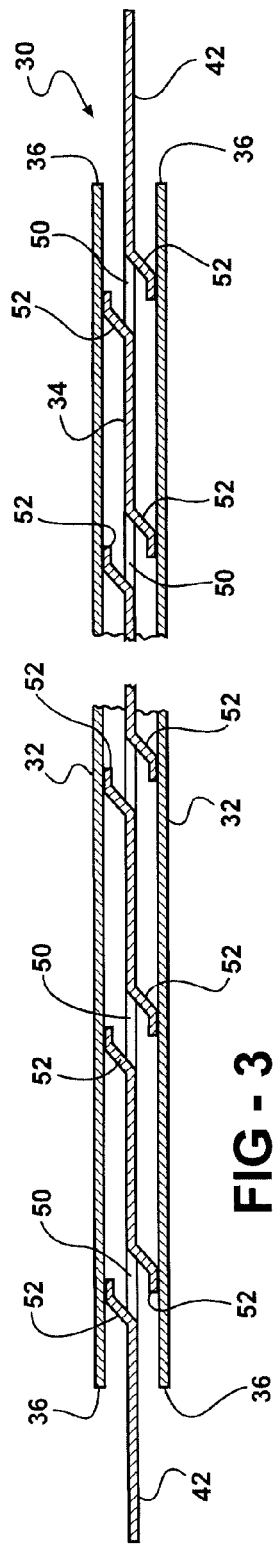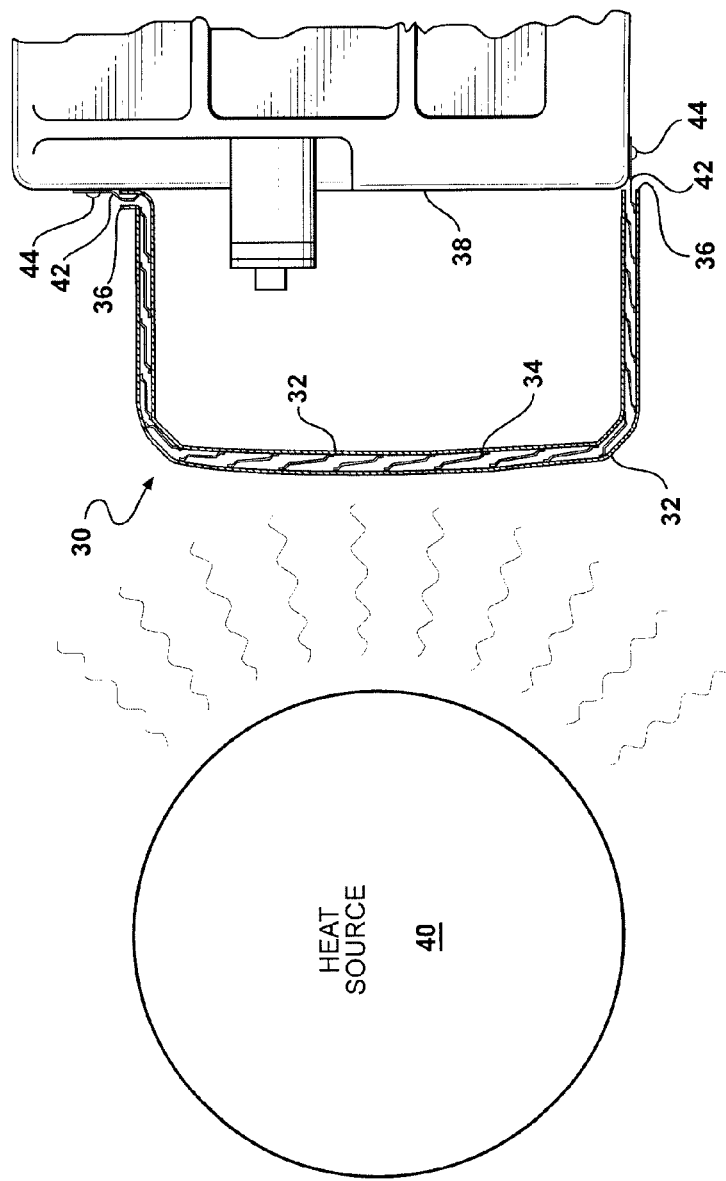

HEAT SHIELD WITH INTEGRAL ATTACHMENT FLANGES

CROSS REFERENCE TO RELATED APPLICATIONS

The present application claims priority to U.S. provisional application entitled AL-RE HEAT SHIELD WITH FABRICATED IN-PLACE ATTACHMENT FLANGES having Ser. No. 60/737,973 and filed on Nov. 18, 2005.

BACKGROUND OF THE INVENTION

1. Field of the Invention

The subject invention relates to a heat shield, and in particular a heat shield made from a layered sheet material including aluminum facings and a perforated steel core which maintains an air-space separation between the aluminum facings.

2. Related Art

Modern internal combustion engines are typically designed to have high working temperatures to provide high thermodynamic and fuel consumption efficiencies. These high working temperatures, however, are a source of great practical difficulty for features in proximity to a heat source. Accordingly, careful heat management is necessary to ensure that the components of an engine which are ill-suited for operation in high temperature environments are properly protected from high heat sources. Proper heat protection will ensure reliable system and component operations over the life of the engine.

Heat shields are used as a technique for managing heat in a vehicular engine. According to the prior art, a heat shield is affixed to the components to be shielded by brackets or clips. These mounting techniques require features added to the heat shield and/or the component to be shielded to hold the heat shield in position. Because the exact configuration of the heat shield can vary from model to model and application to application, it can be difficult and expensive to provide mounting features in some applications. In addition, when mounting features are secured to the heat shield with rivets or other fasteners, stress concentrations can be induced leading to premature cracking or other failure modes.

Accordingly, alternative techniques for mounting heat shields, other than clips, brackets or other added features, would be beneficial.

SUMMARY OF THE INVENTION

A layered heat shield assembly is provided of the type used in vehicular applications to create a thermal barrier between a heat source and a temperature sensitive component. The assembly comprises first and second metallic facing sheets having generally aligned peripheral edges. A metallic core is disposed between and directly connects the first and second facing sheets. The core establishes a generally consistent spacing between the first and second sheets. The core includes a plurality of integral flanges projecting in cantilever fashion outwardly from the peripheral edges of the first and second sheets. The integral flanges establish extended fixation points for supporting the assembly relative to a heat source.

According to another aspect of the invention, a method is provided for making a layered heat shield assembly of the type used in vehicular applications to create a thermal barrier between a heat source and a temperature sensitive component. The method comprises the steps of forming a first metallic facing sheet having peripheral edges and also forming a second metallic facing sheet having peripheral edges that are substantially equivalent in size and shape to the first facing sheet. The method further includes forming a metallic core from sheet material and then perforating the core in a plurality of spaced-apart locations. At least one leg is bent out of the sheet material obliquely away from each perforation. The method includes affixing each leg to respective inside surfaces of the first and second facing sheets so that the core establishes a generally consistent spacing between the first and second facing sheets and holds the first and second facing sheets in an overlapping, generally aligned condition. The improvement comprises forming a plurality of flanges integrally from the core and directing the flanges outwardly from the generally aligned peripheral edges of the first and second facing sheets so that the integral flanges establish extended fixation points for supporting the assembly relative to a heat source.

The integral flanges which extend directly from the core can be directly attached to a supporting article to affix the subject heat shield assembly in an operative position without the need for added brackets, clips or other features to accomplish fixation.

BRIEF DESCRIPTION OF THE DRAWINGS

These and other features and advantages of the present invention will become more readily appreciated when considered in connection with the following detailed description and appended drawings, wherein:

FIG. 1 is a cross-sectional view of a typical prior art heat shield of the type including a pair of spaced apart aluminum facing materials having an interstitial perforated steel core forming a baffle-like gap filling function;

FIG. 2 is a simplified view showing a prior art heat shield affixed to a feature requiring protection from a heat source using prior art bracket and clip devices;

FIG. 3 is a cross-sectional view as in FIG. 1 but showing a heat shield according to the subject invention including flange-like extensions formed by the core material to provide fixation points; and FIG. 4 is a view similar to FIG. 3 but showing a heat shield according to the subject invention which is supported relative to a heat source through the flanges.

DETAILED DESCRIPTION OF THE PREFERRED EMBODIMENT

Referring to the Figures, wherein like numerals indicate like or corresponding parts throughout the several views, a prior art style heat shield is generally shown at 10 in FIG. 1. The assembly 10 includes a pair of sheet-like aluminum facings held in a spaced, generally parallel orientation by a core material 14. The core 14 is fabricated of a perforated steel or stainless steel material in an off-set, zigzag pattern by which the point of attachment between the core 10 and one aluminum facing is off-set from its point of attachment to the other aluminum facing. Accordingly, heat conducted through the core material 14 between the aluminum facings 12 is forced to traverse a distance greater than the normal spacing between the aluminum facings 12. In addition, the core 14 is perforated thereby enhancing cooling through ventilation and natural convection. The prior art heat shield assembly 10 has a perimeter defined by boundary edges 16 which may be formed by a simple cutting or stamping operation wherein all three material layers 12, 14 are simultaneously formed and sheared.

As shown in FIG. 2, the heat shield assembly 10 can be deployed in an application where a component 18 (or components) to be protected is maintained in close proximity to a heat source 20. The heat shield 10 thus forms a barrier between the heat source 20 and the components 18 to be protected primarily from radiant heat energy but also from convective heat energy. Supplemental attachment features such as bracket 22 and clip 24 are required for mounting the heat shield assembly 10 to the component to be protected 18. These brackets 22 and clips 24 add expense and complexity to the assembly operation, and can contribute to premature failure of the assembly 10. For example, bracket 22 requires an added fixation bolt 23 set into a drilled and tapped hole. And clip 24 requires the formation of a special mating feature 25 which adds weight and complexity to the system. Furthermore, the rivets 26 can diminish the overall heat shielding efficiency of the assembly 10 by providing a thermal conductive path directly between the facings 12. The rivets 26 can also lead to premature failure by creating stress concentrations.

In contrast, FIGS. 3 and 4 illustrate an improved heat shield assembly generally shown at 30. The heat shield assembly 30 is constructed similarly to the prior art device in that a pair of aluminum facings 32 are held in a consistently spaced, generally parallel orientation by an interstitial core material 34 having the characteristic zigzag baffle pattern described above. The edges 36 of the aluminum facing 32 establish the general boundary of the effective area for shielding components from a heat source.

As best shown in FIG. 3, the core 34 includes a plurality of perforations 50 which are formed in a stamping or other suitable operation. The tooling used to form the perforations 50 create alternating up and down legs 52 from the upset material. The legs 52, in turn, are attached such as by welding to the inside surfaces of the first and second facing sheets 32, creating an integral assembly. The rigid nature of the core 34 results in a stiff corrugation-like construction where first and second facing sheets 32 are held parallel and spaced from one another and air is enabled to circulate convectively through the interstitial space via the network of perforations 52. An equivalent construction of the core 34 comprises a plurality of discrete segments formed in the depicted zigzag baffle pattern with leg segments adjoining the respective inside faces of the first and second facing sheets 32 for maintaining a generally consistent spacing.

Referring to FIG. 4, the heat shield assembly 30 is shown in an exemplary operative position affixed near components 38 to be protected. A heat source 40 is depicted in close proximity. Instead of the prior art add-on bracket and clip features, which have certain disadvantages, the subject heat shield assembly 30 is provided with integral flanges 42 extending from the core 34 and beyond the edges 36 of the aluminum facing materials 32. Noticeably absent from the component 38 to be protected are additional fixation bolts and special mating features to anchor clips and brackets. The flanges 42 are preferably made from non-perforated material, whereas the remainder of the core 34, i.e., residing between the aluminum facings 32, is perforated to promote air circulation and better heat transfer.

The flanges 42 are ideally suited for fixation directly to the components to be protected 38, such a by welding as shown at 44. Alternatively, high temperature adhesive or mechanical clipping or interlocking of the flanges 42 may be used instead of welding, as well as fasteners.

The flanges 42 provide substantial enhanced versatility to the heat shield assembly 30, while reducing cost and improving service life through the elimination of high failure rate, high stress components. The novel flange construction 42 enables the heat shield assembly 30 to be affixed directly to certain heat sources, for example an exhaust pipe, rather than to the component 38 to be protected as illustrated in FIG. 4. Of course, many other application mounting locations are possible. By proper selection of materials, the flanges 42 can be modified to allow for welding directly to stainless steel surfaces.

While prior art heat shield assemblies to not allow for welding unless added features are provided to the outside of the base material construction, the subject heat shield assembly 30 overcomes this disadvantage. By fabricating the core 34 with non-perforated strips (which may include stainless steel core materials), flanges 42 are formed beyond the terminal edges 36 of the aluminum facings 34, and allow for convenient welding points 44.

Obviously, many modifications and variations of the present invention are possible in light of the above teachings. It is, therefore, to be understood that within the scope of the appended claims, the invention may be practiced otherwise than as specifically described.

What is claimed is:

1. A layered heat shield assembly for a vehicle to create a thermal barrier between a heat source and a temperature sensitive component, said assembly comprising:
    first and second metallic facing sheets having generally aligned peripheral edges;
    a metallic core disposed between and directly connecting each of said first and second facing sheets, said core establishing a generally consistent spacing between said first and second facing sheets;
    and said core including a plurality of flanges projecting in cantilever fashion outwardly from between said peripheral edges of said first and second facing sheets, whereby said flanges establish extended fixation points for supporting said assembly relative to a heat source.

2. The assembly of claim 1, wherein said core includes a plurality of spaced-apart perforations, with said flanges remaining devoid of perforations.

3. The assembly of claim 2, wherein said core includes at least one leg formed adjacent each of said perforations, said leg fixedly attached to an inside surface of one of said first and second facing sheets.

4. The assembly of claim 2, wherein said core includes a pair of legs formed adjacent each of said perforations, said pair of legs extending in opposite directions for fixed attachment to respective inside surfaces of said first and second facing sheets.

5. The assembly of claim 1, wherein said first and second facing sheets are fabricated from sheet aluminum material.

6. The assembly of claim 1, wherein said core is fabricated from sheet steel material.

7. The assembly of claim 1, wherein said first and second facing sheets extend continuous and uninterrupted within the area bounded by said peripheral edges.

8. A layered heat shield assembly for a vehicle to create a thermal barrier between a heat source and a temperature sensitive component, said assembly comprising:
    first and second metallic facing sheets fabricated from sheet aluminum material and having generally aligned peripheral edges;
    a metallic core fabricated from sheet steel material and disposed between and directly connecting each of said first and second facing sheets, said core establishing a generally consistent spacing between said first and second facing sheets, said core including a plurality of spaced-apart perforations and a pair of legs formed adjacent each of said perforations, said pair of legs extending in opposite directions for fixed attachment to respective inside surfaces of said first and second facing sheets;

and said core including a plurality of flanges formed as a single piece of the sheet steel material of said metallic core, said flanges projecting in cantilever fashion outwardly from said peripheral edges of said first and second facing sheets, said flanges devoid of perforations, whereby said flanges establish extended fixation points for supporting said assembly relative to a heat source.

9. A method for making a layered heat shield assembly to create a thermal barrier between a heat source and a temperature sensitive component, said method comprising the steps of:

forming a first metallic facing sheet having peripheral edges;

forming a second metallic facing sheet having peripheral edges substantially equivalent in size and shape to the first facing sheet;

forming a metallic core from sheet material;

perforating the core in a plurality of spaced-apart locations;

bending at least one leg out of the core sheet material obliquely away from each perforation;

affixing each leg to respective inside surfaces of the first and second facing sheets so that the core establishes a generally consistent spacing between the first and second facing sheets and holds the first and second facing sheets in an overlapping, generally aligned condition;

and forming a plurality of flanges from the sheet material of the core and directing the flanges outwardly from between the peripheral edges of the first and second facing sheets so that the flanges establish extended fixation points for supporting the assembly relative to a heat source.

10. The method of claim 9 wherein said perforating step includes spacing all of the perforations away from the flanges.

* * * * *